(12) United States Patent
Clinton et al.

(10) Patent No.: US 7,149,055 B2
(45) Date of Patent: Dec. 12, 2006

(54) INDUCTIVE WRITE HEAD DRIVEN ONLY BY AN AMPERE WIRE

(75) Inventors: Thomas William Clinton, Pittsburgh, PA (US); Petrus Antonius van der Heijden, Cranberry Township, PA (US); Michael Allen Seigler, Pittsburgh, PA (US); Jonathan D. Hannay, Pittsburgh, PA (US)

(73) Assignee: Seagate Technology LLC, Scotts Valley, CA (US)

(*) Notice: Subject to any disclaimer, the term of this patent is extended or adjusted under 35 U.S.C. 154(b) by 538 days.

(21) Appl. No.: 10/736,358

(22) Filed: Dec. 15, 2003

(65) Prior Publication Data

US 2004/0169950 A1    Sep. 2, 2004

Related U.S. Application Data

(63) Continuation-in-part of application No. 10/084,033, filed on Feb. 27, 2002, now Pat. No. 6,665,136.

(51) Int. Cl.
*G11B 5/127*  (2006.01)
(52) U.S. Cl. ............... 360/125; 360/122; 360/126; 360/128
(58) Field of Classification Search ............... 360/128
See application file for complete search history.

(56) References Cited

U.S. PATENT DOCUMENTS

| 4,191,982 A | 3/1980 | Wood et al. |
| 4,405,960 A | 9/1983 | Pick et al. |
| 4,631,612 A | 12/1986 | Shiiki et al. |
| 4,763,215 A | 8/1988 | Gueugnon et al. |
| 4,771,350 A | 9/1988 | Desserre |
| 6,950,280 B1 * | 9/2005 | Rea et al. .................. 360/126 |
| 2003/0021191 A1 | 1/2003 | Hsu et al. |

* cited by examiner

*Primary Examiner*—Andrea Wellington
*Assistant Examiner*—Dan I Davidson
(74) *Attorney, Agent, or Firm*—Robert P. Lenart, Esq.; Pietragallo, Bosick & Gordon LLP

(57) ABSTRACT

A magnetic recording head comprises a write pole having a tip adjacent to an air bearing surface of the recording head, a return pole magnetically coupled to the write pole, a conductor positioned adjacent to at least one edge of the write pole at the air bearing surface for carrying current to produce a magnetic field that saturates at least a portion of the write pole and augments a write field, a first conductive heat sink connected to a first end of the conductor, and a second conductive heat sink connected to a second end of the conductor. Disc drives that include the recording head are also included.

21 Claims, 6 Drawing Sheets

INDUCTIVE WRITE HEAD DRIVEN ONLY BY AN AMPERE WIRE

CROSS-REFERENCE TO A RELATED APPLICATION

This application is a continuation-in-part of U.S. patent application Ser. No. 10/084,033, filed Feb. 27, 2002 now U.S. Pat. No. 6,665,136, which is hereby incorporated by reference.

FIELD OF THE INVENTION

This invention relates to magnetic recording heads and more particularly to magnetic recording heads using a conductor to produce a recording field.

BACKGROUND OF THE INVENTION

As data storage densities in magnetic recording continue to progress in an effort to increase the storage capacity of hard disc drives, magnetic transition (bit) dimensions and recording head critical features are being pushed below 100 nm. In addition, making the recording medium stable at higher areal densities requires magnetically harder (high coercivity) storage medium materials. Traditionally, writing to a harder medium has been achieved by increasing the saturation magnetization, or $4\pi M_s$ value, of the magnetic material of the inductive write head, thus bolstering the magnetic field applied to the medium. Though there has been some success in materials research efforts to increase $M_s$ of the write head, the rate of increase is not sufficient to sustain the annual growth rate of bit areal densities in disc storage. Another way to write to progressively harder medium is to locally reduce the coercivity of the medium during the writing process. Typically, this would be accomplished by locally heating the medium (by optical, or, more generally, electromagnetic stimulation) to lower its temperature-dependent coercivity during the writing process. This technique has thus far been limited to proof of concept laboratory demonstrations.

Accordingly, there is a need for a recording head that is capable of overcoming the high coercivity of magnetic storage media, and which would be practical to manufacture.

SUMMARY OF THE INVENTION

Magnetic recording heads constructed in accordance with this invention comprise a write pole having a tip adjacent to an air bearing surface of the recording head, a return pole magnetically coupled to the write pole, a conductor positioned adjacent to at least one edge of the write pole at the air bearing surface for carrying current to produce a magnetic field that saturates at least a portion of the write pole and augments a write field, a first conductive heat sink connected to a first end of the conductor, and a second conductive heat sink connected to a second end of the conductor.

In another aspect, the invention encompasses disc drives comprising a motor for rotating a storage medium and an arm for positioning a recording head adjacent to the storage medium, wherein the magnetic recording head includes a write pole having a tip adjacent to an air bearing surface of the recording head, a return pole magnetically coupled to the write pole, a conductor positioned adjacent to an edge of the write pole at the air bearing surface for carrying current to produce a magnetic field for saturating at least a portion of the write pole and augmenting a write field, a first conductive heat sink connected to a first end of the conductor, and a second conductive heat sink connected to a second end of the conductor.

In another aspect, the invention encompasses magnetic recording heads comprising a write pole having a tip adjacent to an air bearing surface of the recording head, a return pole magnetically coupled to the write pole, a conductor positioned adjacent to at least one edge of the write pole at the air bearing surface, a first conductive heat sink connected to a first end of the conductor, and a second conductive heat sink connected to a second end of the conductor, wherein current in the conductor and the first and second conductive heat sinks produces a magnetic field that saturates at least a portion of the write pole and augments a write field.

DETAILED DESCRIPTION OF THE INVENTION

This invention provides a magnetic write head that is energized and field-amplified by a wire positioned adjacent to a write pole at an Air Bearing Surface (ABS). The write heads of this invention are referred to as Wire Amplified Magnetic Recording (WAMR) heads. The wire that is used to produce the write field is referred to as an Ampere wire. The Ampere wire generates large local magnetic fields (>kOe) by way of large current densities (>$10^9$ A/cm$^2$) in a thin-film wire. The high flux density from the Ampere wire magnetizes the write pole(s) and generates enough additional flux density with an appropriate field direction and spatial profile to augment the write field. In addition to an increased field magnitude, the field profile from the wire maps onto that of the write pole so as to yield improved field gradients. This design requires no current-carrying "coils" to magnetize the inductive writer, minimizing the device inductance (and complexity), and thus, increasing the bandwidth from that of a traditional multi-coil inductive writer.

Figure 1:
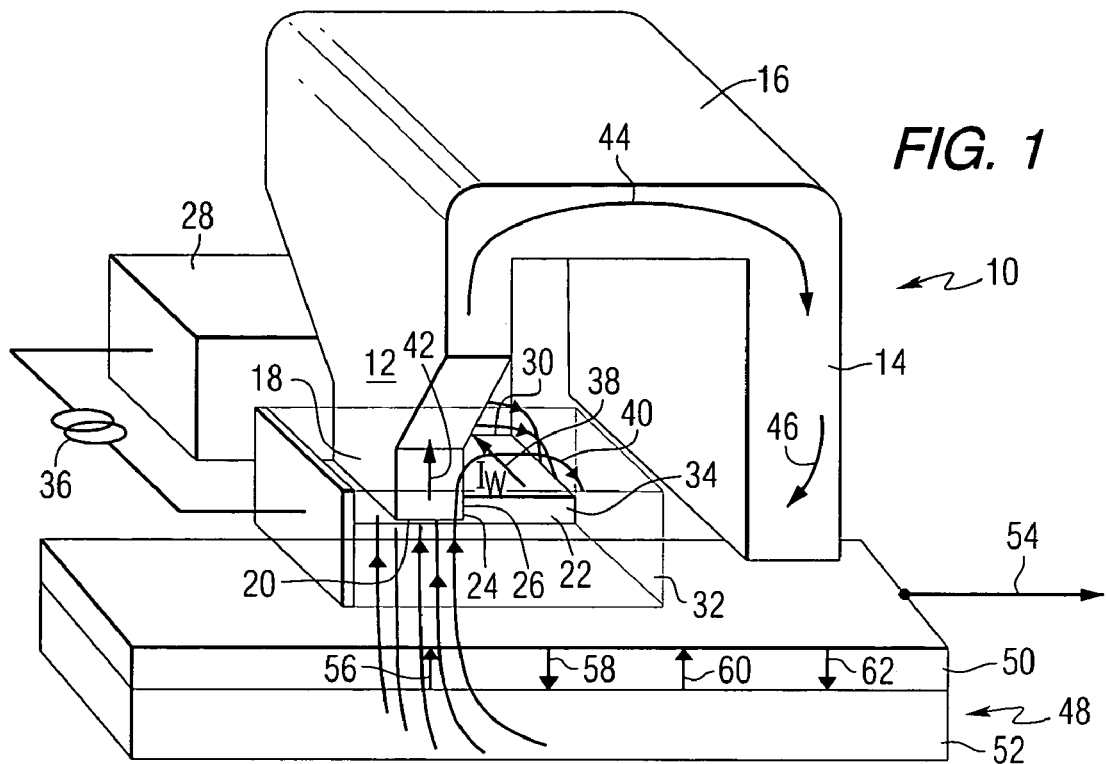
FIG. 1 is a pictorial representation of a magnetic recording head constructed in accordance with this invention.

Referring to the drawings, FIG. 1 is a schematic representation of a magnetic recording head 10 constructed in accordance with this invention. The recording head includes a write pole 12 and a return pole 14 magnetically coupled by a yoke 16. A tip 18 of the write pole is positioned adjacent to an air bearing surface (ABS) 20 of the recording head. A conductor 22 has a rectangular cross-section and is positioned along the air bearing surface and between the write pole and the return pole. An edge 24 of the conductor 22 is positioned adjacent to an edge 26 of the write pole. A first electrical contact/heat sink 28 is electrically connected to a first end 30 of the conductor. A second electrical contact/heat sink 32 is electrically connected to a second end 34 of the conductor. The electrical contact/heat sinks are coupled to a current source 36. Current from the current source flows through the electrical contact/heat sinks and the conductor as illustrated by arrow 38. This current creates a magnetic field around the conductor as illustrated by arrows 40. The magnetic field induces a magnetic field in the write pole, which passes through the yoke and return pole as illustrated by arrows 42, 44 and 46. Insulation can be inserted to electrically isolate the write pole from the ampere wire and the contact/heat sinks. In operation, the air bearing surface of the recording head is positioned adjacent to a recording medium 48, that includes a magnetically hard recording layer 50 and a magnetically soft underlayer 52. As the recording media moves as illustrated by arrow 54, the direction of magnetization of magnetic domains 56, 58, 60 and 62 in the recording layer is affected by the magnetic field in the vicinity of the write pole tip.

In the recording head of FIG. 1, the Ampere wire conductor is integrated with a "single-pole" writer at the ABS, such that one edge of the wire is near the inside edge of the single pole (or write pole), which is the writing (or trailing) edge. Thus, the wire is inside the gap formed between the write pole and the return pole. In this design the flux generated by the wire has the same orientation as the flux coupled into the magnetic yoke (both flowing clockwise in FIG. 1), and represents a very efficient magnetic coupling between the two elements. At high current densities in the Ampere wire (>$10^9$ A/cm$^2$), there is a large enough flux density generated local to the write pole that the magnetization of at least a portion of the write pole is driven to saturation, beyond which the additional field from the wire augments the field from the pole, resulting in magnetic-field amplification. Fields at the trailing edge of the wire cancel field from the pole, leading to a sharper down-track field profile.

Figure 2:
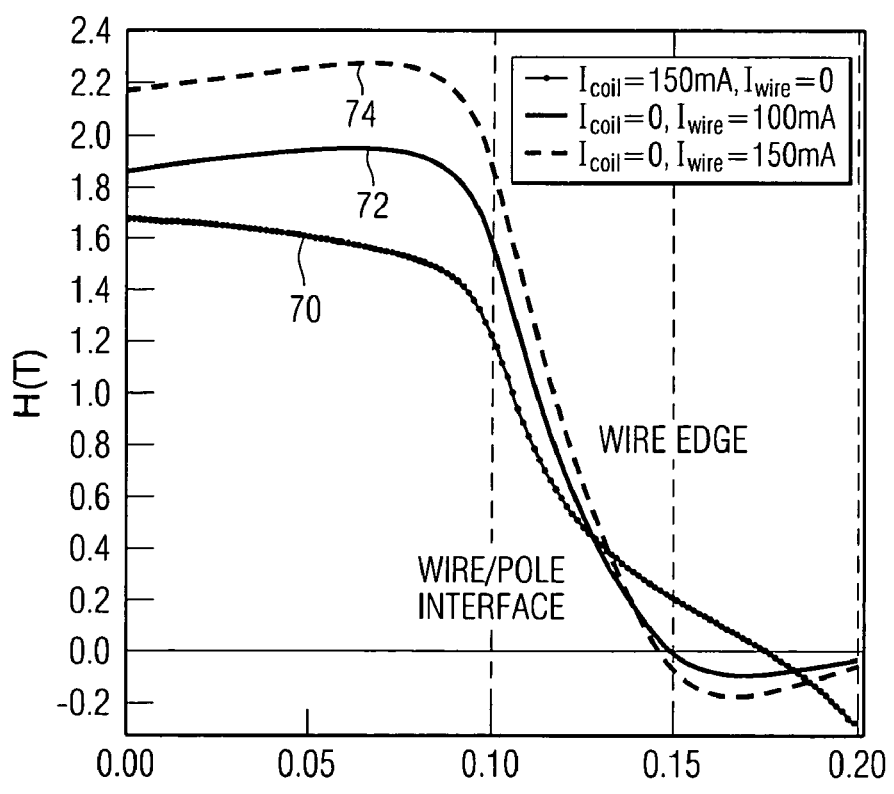
FIG. 2 is a graph of a calculated magnetic field for various recording head parameters.

FIG. 2 a graph of a calculated magnetic field for various recording head parameters based on finite element modeling (FEM) of the perpendicular field versus down-track position for the recording head of FIG. 1. This model used a wire having down-track dimension of 50 nm and a throat height of 50 nm. The down-track write pole dimension was 300 nm, and there was no gap between the wire and the write pole. The gap between the write pole and the return pole was 100 nm. Trace 70 is the field profile for this magnetic yoke when magnetized by the traditional method of coil windings (150 mA-turns, not depicted) away from the ABS, and no current to the Ampere wire. Trace 72 is the case where 100 mA ($4 \times 10^9$ A/cm$^2$) is driven through the Ampere wire only, and no other source is used to magnetize the yoke. The peak field magnitude is increased, the peak field is more coincident with the peak down-track gradient (near the interface of the pole and wire, as shown in FIG. 1), and the field gradient is sharper. Trace 74 is the case where 150 mA ($6 \times 10^9$ A/cm$^2$) is driven through the Ampere wire only. In this case, the model indicates there is a further amplification of the net field and an even sharper field gradient as the Ampere wire generates more field at higher current density. Thus, the model indicates that the writer can be driven by the Ampere wire alone, and that key writing characteristics, such as field magnitude, field gradient and coincidence of peak field and peak gradient are all improved from those of the current technology.

Figure 3:
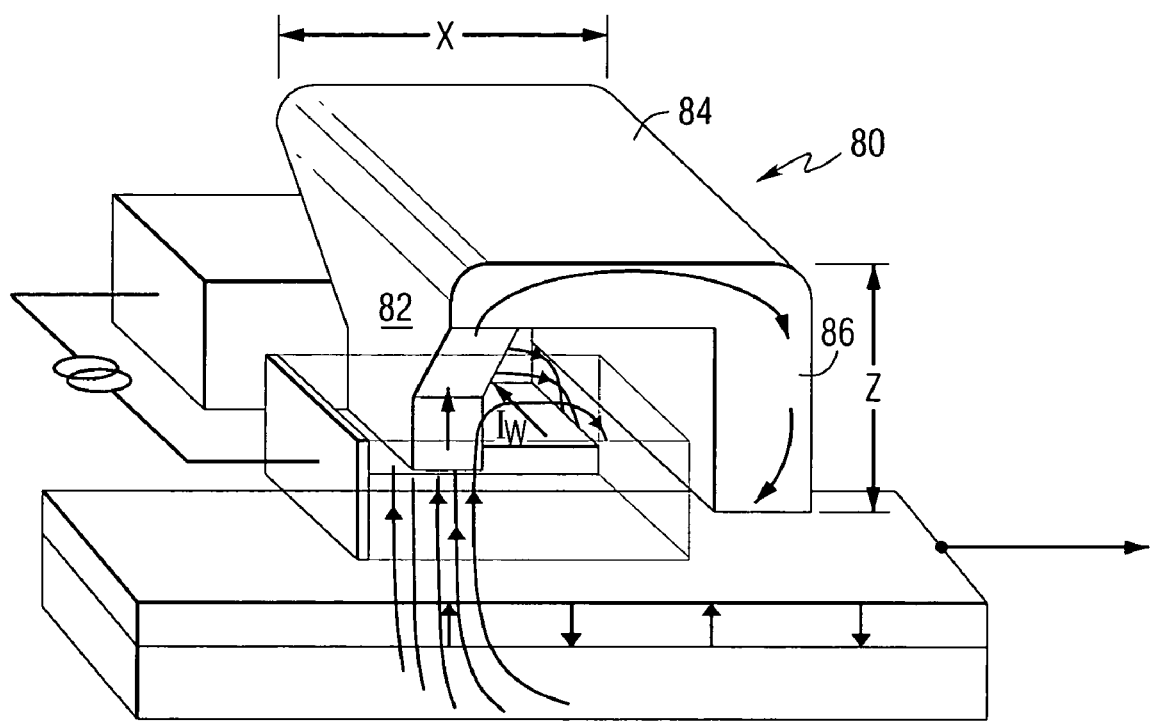
FIG. 3 is a schematic representation of another magnetic recording head constructed in accordance with this invention.

FIG. 3 is a pictorial representation of another magnetic recording head 80 constructed in accordance with this invention. FIG. 3 is a variation on the design of FIG. 1 that demonstrates the flexibility of the magnetic yoke design, which can be readily optimized to achieve the best writing performance and efficiency. In the recording head of FIG. 3, the write pole 82, the yoke 84, and the return pole 86 are more compact than the corresponding components of FIG. 1. The other components of FIG. 2 are the same as in FIG. 1. The absence of coil(s) allows the yoke to be more compact, with a shorter overall length (decreasing yoke dimensions x and z, for example, creates a shorter flux path) to minimize reluctance to flux flow. Also, the closer proximity between the yoke and the surface of the Ampere wire opposite the ABS couples the flux of the wire more effectively through the yoke. The gap dimension between the write pole and the return pole can be changed without departing from the scope of this invention. In addition, the yoke structure can contribute to improvements in the magnetic characteristics of the pole, such as remanence, coercivity, dynamic response, etc. Various yoke designs can be used.

Figure 4:
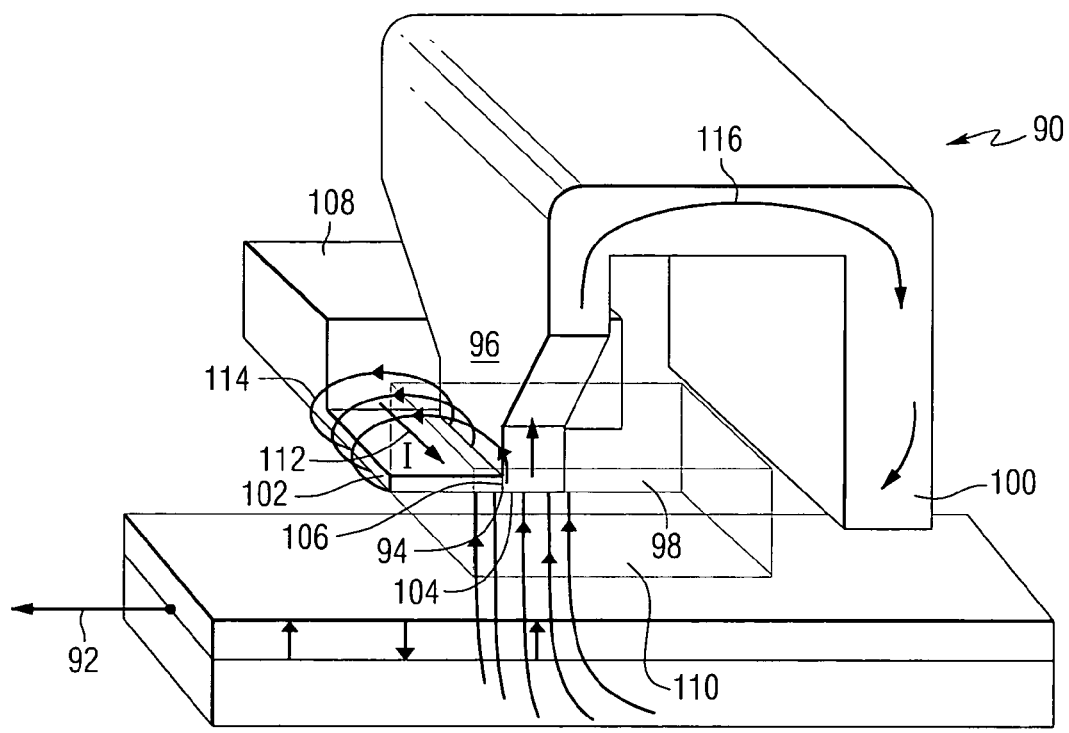
FIG. 4 is a schematic representation of another magnetic recording head constructed in accordance with this invention.

FIG. 4 is a pictorial representation of another magnetic recording head 90 constructed in accordance with this invention. In the example of FIG. 4, direction of movement of the storage medium as indicated by arrow 92 is opposite to the direct of movement of the storage medium in FIG. 1. In the recording head of FIG. 4, the writing/trailing edge 94 of the write pole 96 is outside of the gap 98 between the write pole and the return pole 100. Conductor 102 has a rectangular cross-section and is positioned adjacent to the air bearing surface 104 of the recording head. An edge 106 of conductor 102 is positioned adjacent to the writing/trailing edge of the write pole. Contacts/heat sinks 108 and 110 are used to supply current 112 to the conductor 102. The current produces a magnetic field 114 that induces a magnetic field 116 in the write pole. Magnetic field 114 has a magnitude sufficient to saturate at least a portion of the write pole and further augments the write pole field. The combination of the write pole field and the field from conductor 102 is used to affect the magnetization of magnetic domains in the storage medium. This design may have unique writing characteristics, such as field spatial profile, that are desirable.

Figure 5:
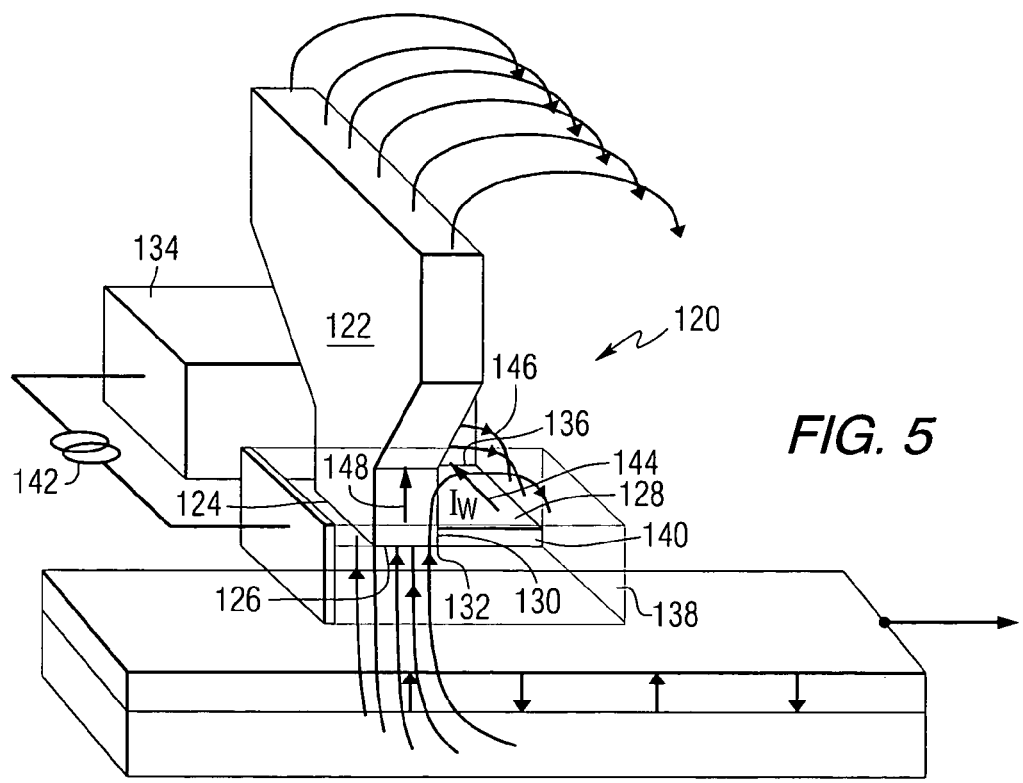
FIG. 5 is a schematic representation of another magnetic recording head constructed in accordance with this invention.

FIG. 5 is a pictorial representation of a portion of another magnetic recording head 120 constructed in accordance with this invention. The example of FIG. 5 includes a planar yoke-like structure. The write pole 122 has a tip 124 that is positioned adjacent to an air bearing surface 126 of the recording head. A conductor 128 has a rectangular cross-section and is positioned along the air bearing surface and between the write pole and the return pole which is in the same plane as the write pole. An edge 130 of the conductor 128 is positioned adjacent to an edge 132 of the write pole. A first electrical contact/heat sink 134 is electrically connected to a first end 136 of the conductor. A second electrical contact/heat sink 138 is electrically connected to a second end 140 of the conductor. The electrical contact/heat sinks are coupled to a current source 142. Current from the current source flows through the electrical contact/heat sinks and the conductor as illustrated by arrow 144. This current creates a magnetic field around the conductor as illustrated by arrows 146 and induces a magnetic field in the write pole illustrated by arrow 148. This design is very low complexity and makes fabrication of a device more straightforward. There are many design options for the return pole that can be readily implemented with the write head of FIG. 5.

Figure 6:
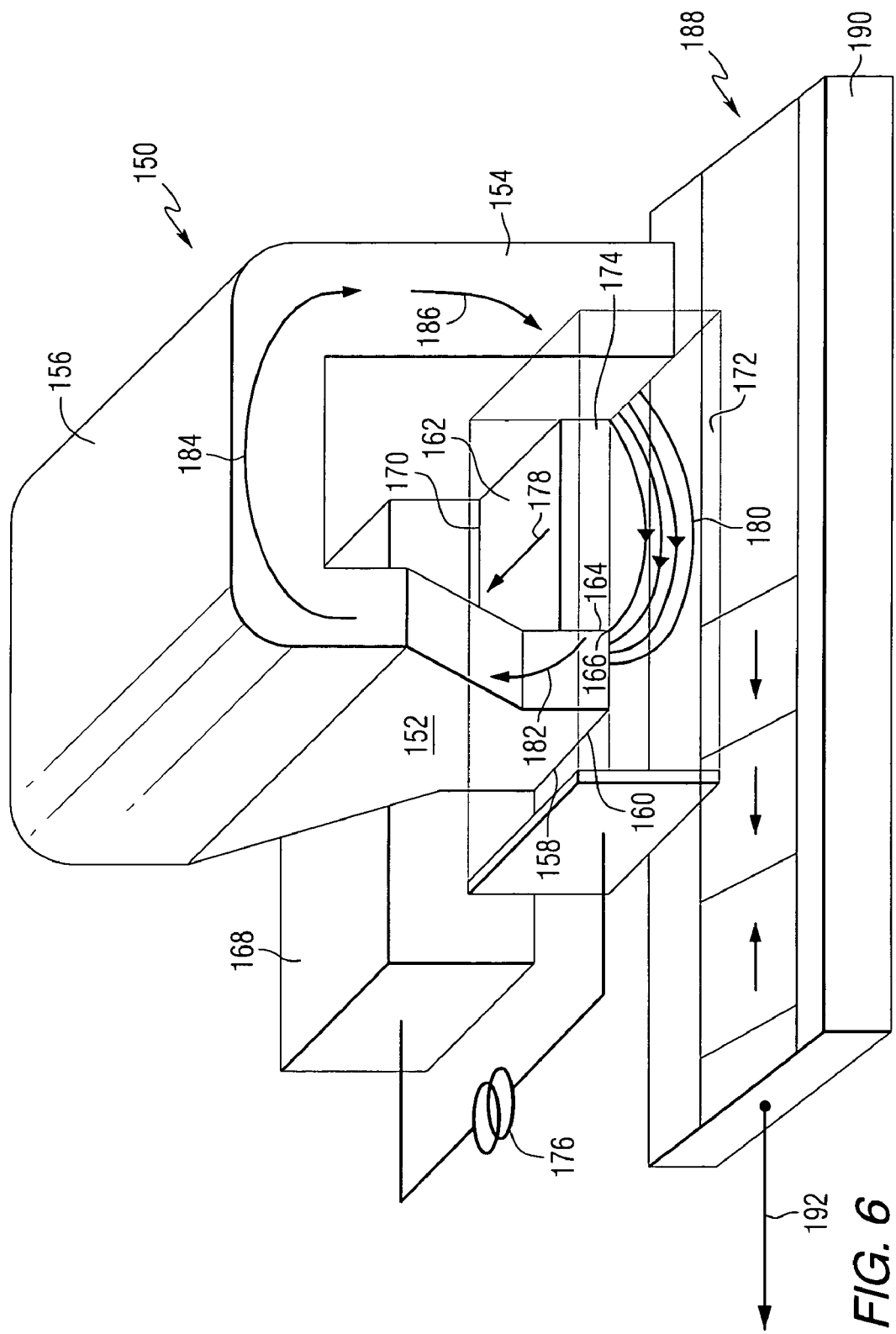
FIG. 6 is a schematic representation of another magnetic recording head constructed in accordance with this invention.

FIG. 6 is a pictorial representation of another magnetic recording head 150 constructed in accordance with this invention. The recording head 150 includes a top pole 152 and a bottom pole 154 magnetically coupled by a yoke 156. A tip 158 of the top pole is positioned adjacent to an air bearing surface (ABS) 160 of the recording head. A conductor 162 has a rectangular cross-section and is positioned along the air bearing surface and between the top pole and the bottom pole. An edge 164 of the conductor 162 is positioned adjacent to an edge 166 of the top pole. A first electrical contact/heat sink 168 is electrically connected to a first end 170 of the conductor. A second electrical contact/heat sink 172 is electrically connected to a second end 174 of the conductor. The electrical contact/heat sinks are coupled to a current source 176. Current from the current source flows through the electrical contact/heat sinks and the conductor as illustrated by arrow 178. This current creates a magnetic field around the conductor as illustrated by arrows 180. The magnetic field induces a magnetic field in the top pole, which passes through the yoke and bottom pole as illustrated by arrows 182, 184 and 186. In operation, the air bearing surface of the recording head is positioned adjacent to a recording medium 188, that includes a magnetically hard recording layer 190. As the recording media moves as illustrated by arrow 192, the direction of magnetization of magnetic domains in the recording layer is affected by the magnetic field in the vicinity of the write pole tip.

FIG. 6 is an example of a longitudinal writer. In the example of FIG. 6, the Ampere wire is sandwiched by the top and bottom pole of an inductive writer. Again, the wire drives the writer on its own, and the fields from the yoke and the wire superimpose to yield an amplified net write field. In particular, the longitudinal writer uses the longitudinal field component to write, and like the perpendicular case, the net-field magnitude and gradients are increased by the action of the Ampere wire.

The materials for the wire can range from conventional good electrical and thermal conductors (a small coefficient of thermal expansion is also desirable), such as Cu, Au, Al, W, Mo, etc., to materials such as carbon nanotubes.

The contacts/heat sinks can also be made with conventional high conductivity materials that are compatible with head processing techniques. The write current can be a traditional (continuous) AC bias (square wave, for example), as heat generated at the high-current densities will be dissipated primarily through the cooling power available at the ABS for a head in flight. This cooling power is well coupled with the head due to the large surface area of the slider and the large contacts that readily sink the Ohmic heat generated in the Ampere wire to the slider.

The recording heads of this invention should readily scale to smaller dimensions, and in some ways will actually perform more efficiently at smaller dimensions. The magnitude of the magnetic field locally generated by the Ampere wire scales inversely with the wire cross-section. Therefore, as recording areal densities increase, and head dimensions shrink, the field magnitude generated by the Ampere wire will increase for the same amount of current, or, conversely, the amount of current required will decrease to deliver the same field. As pole dimensions shrink, it is known that a write pole is harder to magnetize as a result of shape anisotropy, demagnetization, and other scaling effects. This invention is efficient in overcoming this problem since it generates the large flux density locally at the pole. This is unlike a coil-driven writer where low flux density originates at the rear of the yoke and propagates through the narrow pole to create the high flux density. However, flux is also reflected back to the yoke due to the physical and magnetic bottleneck at the pole, requiring more power driven to the coil to compensate and achieve the desired flux density. The large flux density generated locally at the pole that is inherent to the recording heads of this invention should enable the use of higher anisotropy field ($H_k$) pole materials. This is a significant advantage since it relaxes an otherwise rather restrictive materials requirement of engineering $H_k$ to be very small. A larger $H_k$ reduces the likelihood of remanence in the pole, which is an increasingly more serious writer performance issue as pole critical dimension's shrink.

Figure 7:
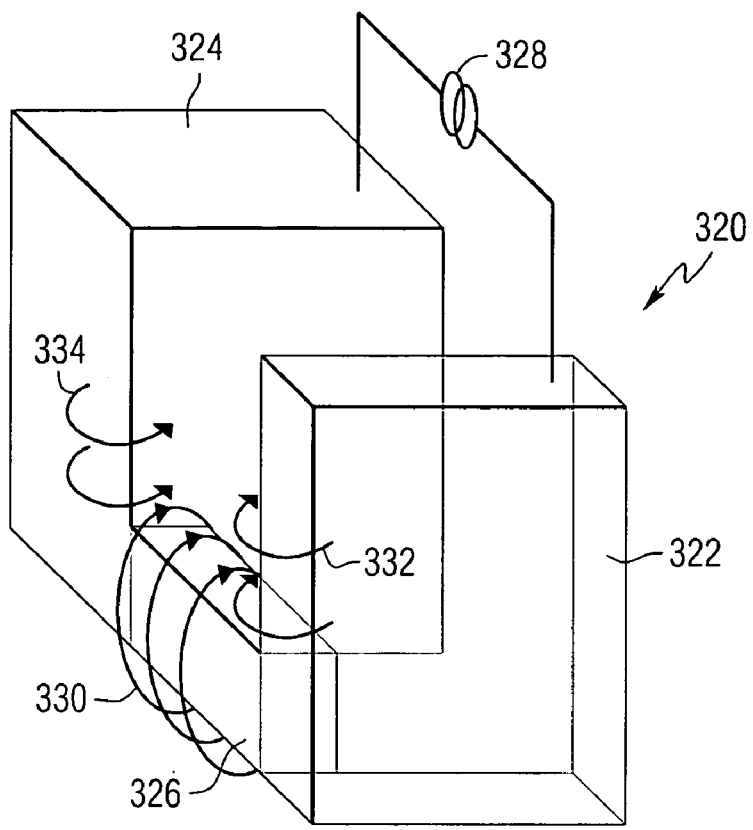
FIG. 7 is a schematic representation of another magnetic recording head constructed in accordance with this invention.

FIG. 7 is a schematic representation of a portion of a magnetic recording head 320 constructed in accordance with the invention. Conductive lead/heat sinks 322 and 324 are electrically connected to opposite ends of a generally rectangular conductor 326 and to a current source 328. The leads have a larger cross-sectional area than the conductor and the conductor is located near a corner of the leads. This configuration can be used to illustrate controlled current crowding in the contacts to reduce cross-track fields in a WAMR head. Current flowing in conductor 326 produces the magnetic field 330. Current flowing/crowding in leads 322 and 324 produces magnetic fields 332 and 334. The field produced by current flowing the conductor 326 and leads 322 and 324 saturates at least a portion of the write pole and augments a write field. The field produced by current flowing/crowding in the leads reduces cross-track fields resulting from current in conductor 326.

Figure 8:
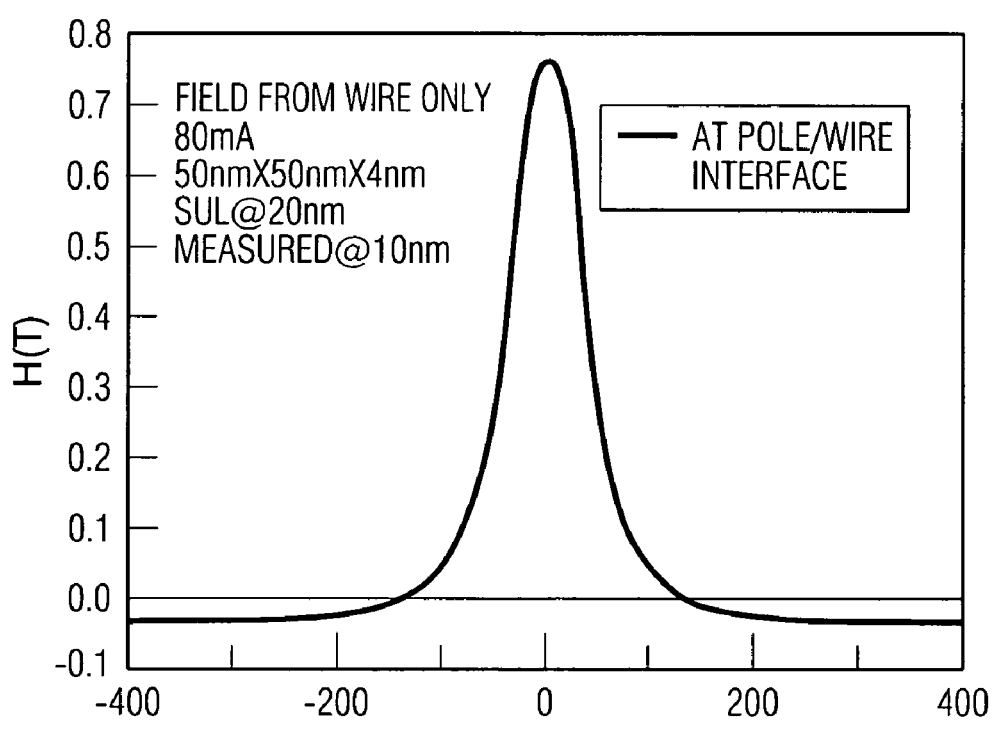
FIG. 8 is a graph of the cross-track field for the head of FIG. 7.

FIG. 8 is a graph of the calculated cross-track magnetic field distribution associated with an Ampere wire and leads/contacts in the configuration of FIG. 7. The field profile indicates that there is a reversal of the field polarity with increasing cross-track position. This field is generated by the large current densities in the leads, while the high densities result from current crowding in the leads near the Ampere wire, as depicted in FIG. 12. In a WAMR structure (an integrated wire and pole such as depicted in any of the perpendicular designs herein), this reversed field polarity counters that from the pole, reducing the stray fields away from the track.

This invention provides a magnetic recording head including a thin-film Ampere wire integrated with a write head at the ABS. The high flux density from the Ampere wire magnetizes the write pole and generates enough additional flux density with an appropriate spatial profile to augment the write field. In addition to an increased field magnitude, the field profile from the wire maps onto that of the write pole so as to yield improved field gradients.

This design requires no current-carrying "coils" to magnetize the inductive writer, minimizing the device inductance, and thus, increasing the bandwidth from that of a traditional multi-coil inductive writer. The recording heads of this invention generate field gradients and field magnitudes that exceed the capability of current technology, and the design can be readily fabricated and manufactured using common, low complexity materials and processing techniques.

Figure 9:
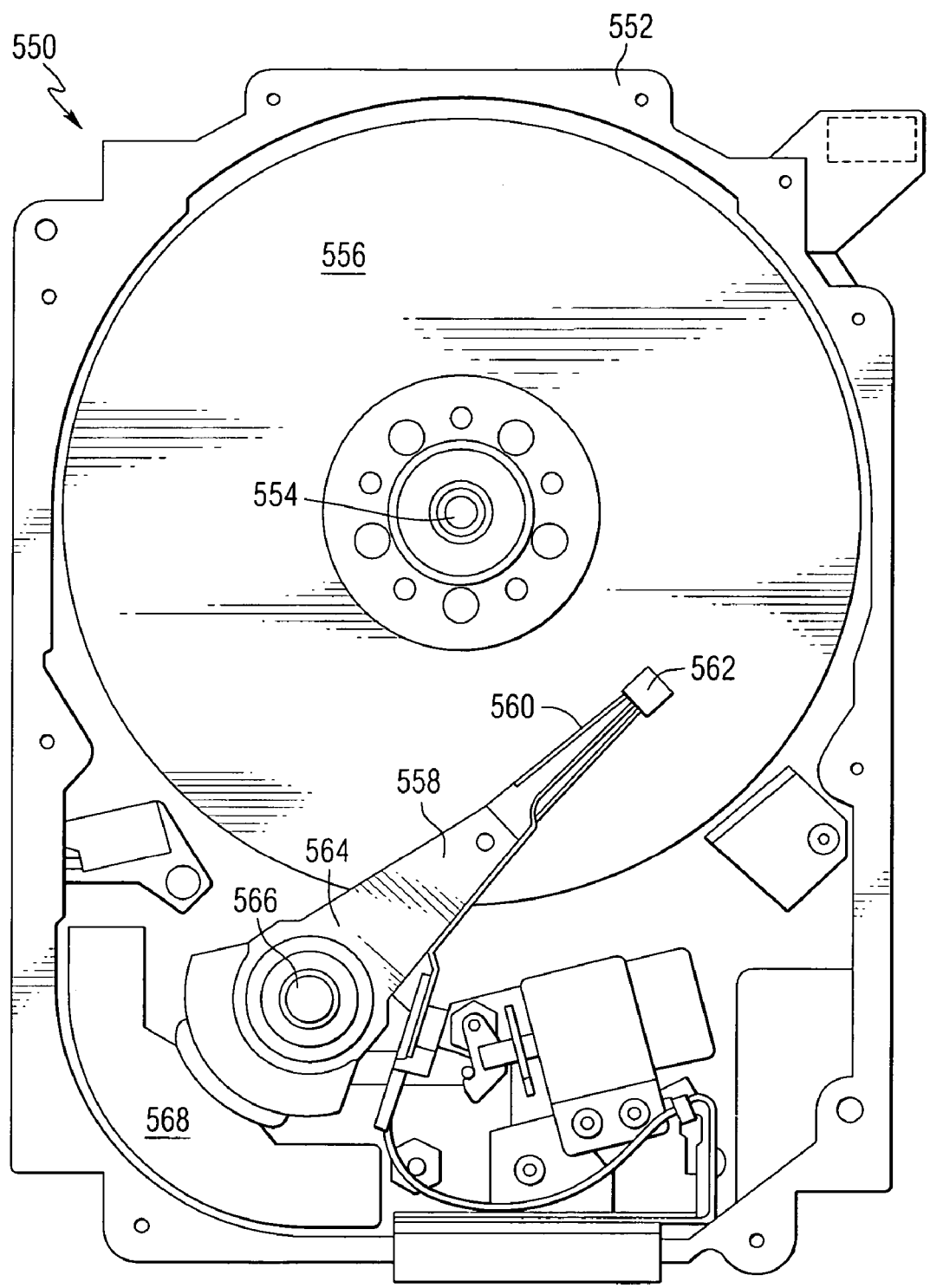
FIG. 9 is a pictorial representation of a disc drive constructed in accordance with this invention.

FIG. 9 is a pictorial representation of a disc drive 550 that can use a recording head constructed in accordance with this invention and can record data in accordance with the method of this invention. The disc drive 550 includes a housing 552 (with the upper portion removed and the lower portion visible in this view) sized and configured to contain the various components of the disc drive. The disc drive 550 includes a spindle motor 554 for rotating at least one magnetic storage medium 556, which may be constructed for either longitudinal or perpendicular magnetic recording, within the housing. At least one arm 558 is contained within the housing 552, with the arm 558 having a first end 560 with a recording head or slider 562, and a second end 564 pivotally mounted on a shaft by a bearing 566. An actuator motor 568 is located at the arm's second end 564 for pivoting the arm 558 to position the recording head 562 over a desired sector or track of the disc 556. The actuator motor 568 is regulated by a controller, which is not shown in this view and is well-known in the art.

While the invention has been described in terms of several examples, it will be apparent that various changes can be made to the described examples without departing from the scope of the invention as set forth in the following claims. In addition, the recording heads are not limited to use in disc drives, but could be used in other storage devices wherein a magnetic field is used to affect the magnetization of a magnetic storage medium.

What is claimed is:

1. A magnetic recording head comprising:
    a write pole having a tip adjacent to an air bearing surface of the recording head;
    a return pole magnetically coupled to the write pole;
    a conductor positioned adjacent to at least one edge of the write pole at the air bearing surface for carrying current to produce a magnetic field that saturates at least a portion of the write pole and augments a write field;
    a first conductive heat sink connected to a first end of the conductor; and
    a second conductive heat sink connected to a second end of the conductor.

2. The magnetic recording head of claim 1, wherein the conductor is positioned between the write pole and the return pole along the air bearing surface.

3. The magnetic recording head of claim 2, wherein the conductor has a width less than a distance between the write pole and the return pole at the air bearing surface.

4. The magnetic recording head of claim 2, wherein the conductor has a width substantially the same as a distance between the write pole and the return pole at the air bearing surface.

5. The magnetic recording head of claim 1, wherein the conductor is positioned adjacent to a side of the write pole opposite the return pole along the air bearing surface.

6. The magnetic recording head of claim 1, wherein the conductor is connected to the first and second conductive heat sinks adjacent to a corner of each of the first and second conductive heat sinks.

7. The magnetic recording head of claim 1, wherein the conductor has a rectangular cross-section having a width along the air bearing surface greater than a thickness substantially perpendicular to the air bearing surface.

8. A disc drive comprising:
    a motor for rotating a storage medium; and
    an arm for positioning a recording head adjacent to the storage medium;
    wherein the magnetic recording head includes a write pole having a tip adjacent to an air bearing surface of the recording head, a return pole magnetically coupled to the write pole, a conductor positioned adjacent to an edge of the write pole at the air bearing surface for carrying current to produce a magnetic field that saturates at least a portion of the write pole and augments a write field, a first conductive heat sink connected to a first end of the conductor, and a second conductive heat sink connected to a second end of the conductor.

9. The disc drive of claim 8, wherein the conductor is positioned between the write pole and the return pole along the air bearing surface.

10. The disc drive of claim 9, wherein the conductor has a width less than a distance between the write pole and the return pole at the air bearing surface.

11. The disc drive of claim 9, wherein the conductor has a width substantially the same as a distance between the write pole and the return pole at the air bearing surface.

12. The disc drive of claim 8, wherein the conductor is positioned adjacent to a side of the write pole opposite the return pole along the air bearing surface.

13. The disc drive of claim 8, wherein the conductor is connected to the first and second conductive heat sinks adjacent to a corner of each of the first and second conductive heat sinks.

14. The disc drive of claim 8, wherein the conductor has a rectangular cross-section having a width along the air bearing surface greater than a thickness substantially perpendicular to the air bearing surface.

15. A magnetic recording head comprising:
    a write pole having a tip adjacent to an air bearing surface of the recording head;
    a return pole magnetically coupled to the write pole;
    a conductor positioned adjacent to at least one edge of the write pole at the air bearing surface;
    a first conductive heat sink connected to a first end of the conductor; and
    a second conductive heat sink connected to a second end of the conductor;
    wherein current in the conductor and the first and second conductive heat sinks produces a magnetic field that saturates at least a portion of the write pole and augments a write field.

16. The magnetic recording head of claim 15, wherein the conductor is positioned between the write pole and the return pole along the air bearing surface.

17. The magnetic recording head of claim 16, wherein the conductor has a width less than a distance between the write pole and the return pole at the air bearing surface.

18. The magnetic recording head of claim 16, wherein the conductor has a width substantially the same as a distance between the write pole and the return pole at the air bearing surface.

19. The magnetic recording head of claim 15, wherein the conductor is positioned adjacent to a side of the write pole opposite the return pole along the air bearing surface.

20. The magnetic recording head of claim 15, wherein the conductor is connected to the first and second conductive heat sinks adjacent to a corner of each of the first and second conductive heat sinks.

21. The magnetic recording head of claim 15, wherein the conductor has a rectangular cross-section having a width along the air bearing surface greater than a thickness substantially perpendicular to the air bearing surface.

* * * * *